UNITED STATES PATENT OFFICE.

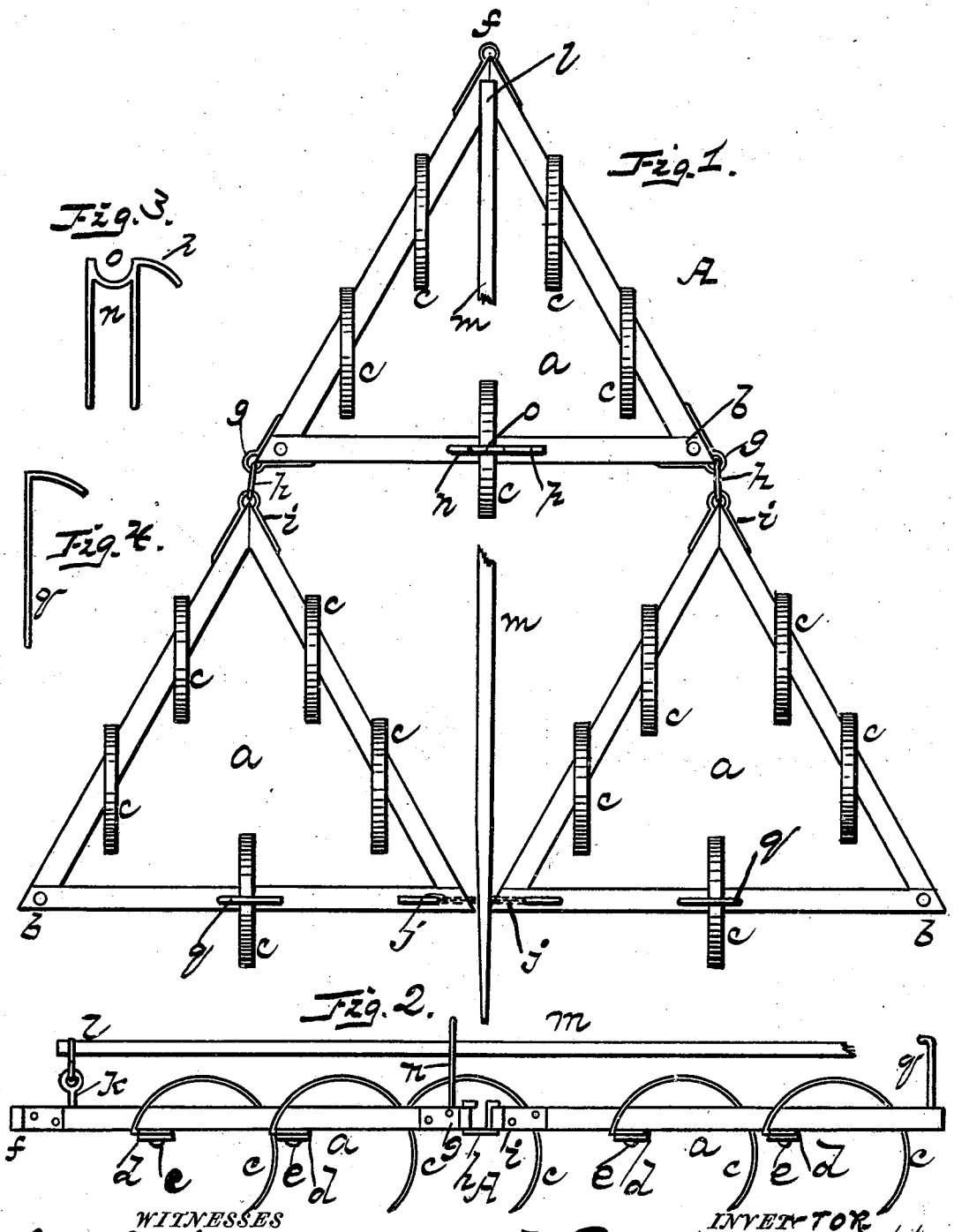

AUGUST BROCKSCHMIDT, OF PIERCE CITY, MISSOURI.

HARROW.

SPECIFICATION forming part of Letters Patent No. 517,137, dated March 27, 1894.

Application filed June 7, 1893. Serial No. 476,803. (No model.)

*To all whom it may concern:*

Be it known that I, AUGUST BROCKSCHMIDT, a citizen of the United States, residing at Pierce City, in the county of Lawrence and State of Missouri, have invented certain new and useful Improvements in Harrows; and I do hereby declare the following to be a full, clear, and exact description of the invention, such as will enable others skilled in the art to which it appertains to make and use the same.

This invention has relation to improvements in harrows and it consists in the novel construction, arrangement, and combination of parts of which it is composed all as will be herein described and particularly pointed out in the appended claim.

The annexed drawings, to which reference is made, fully illustrate my invention, in which—

Figure 1, represents a plan view of my improved harrow. Fig. 2, is a side view of the same. Fig. 3, is a face view of the standard and Fig. 4 is a side view of the hook.

Referring by letter to the accompanying drawings, A, designates the harrow, which is composed of three sections $a$, $a$, $a$, each of which sections being a duplicate of the other. These sections $a$, $a$, $a$, are constructed of suitable material forming a frame in the shape of a triangle; the ends $b$, of which being bolted together.

To the under side of each harrow frame is secured the spring teeth $c$; the same being held in place by a plate or casting $d$ and bolts $e$. At the forward end of the front frame is the clevis $f$, to which a team is attached and at the rear ends thereof are clevises or straps $g$, to which the rear frames are hinged or connected by the link or hook $h$, which is secured to the front clevises or straps $i$ of the rear frames; the two rear frames being connected to one another by a rod or chain $j$, thus forming, by the three frames, when connected to one another a sectional triangular harrow, the teeth of which being set in the desired position for harrowing the soil.

At the front portion of the forward frame of the harrow is a standard $k$, to which is pivoted or hinged the forward end $l$, of the hand lever $m$ and on the rear cross bar of this frame is a support $n$ for said lever the latter resting in the space $o$ between said supports; the latter having a side or lateral hook $p$, for a purpose presently explained.

Secured to the top of the rear cross bar of the two rear sections of the harrow is a hook shaped standard $q$, $q$, for engaging the lever when it is desired to raise the section from the ground. It will thus be seen that my harrow is formed of three sections and providing a triangular harrow, the draft being from the center, the same will run straight, and cannot get clogged by weeds or the like and either of the sections can be readily raised over an obstacle simply by the operator grasping the handle of the lever and raising it from its rest in the support on the front frame and placing it beneath the hook of either frame and raising said lever which in turn causes the frame to be raised from the ground. If desirable a pair of ordinary handles may be attached to each section and a section converted into a spring cultivator by detaching the section from the other sections and using it only, with three or more teeth and a harrow as herein described is durable, easily operated, at the same time cheap to manufacture.

Having thus described my invention, what I claim as new, and desire to secure by Letters Patent, is—

The combination with the front harrow-frame having its rear transverse bar provided with the supports $n$ having the rest $o$ and lateral hook $p$ at top, of the rear harrow frames hinged to the rear corners of the front harrow frame and connected at their inner rear corners by a chain, and the hand-lever $m$ linked at its forward end to the standard $k$ near the front of the front harrow-frame and adapted to engage the rest or hook of the support $n$, as the attendant may desire, substantially as set forth.

In testimony whereof I affix my signature in presence of two witnesses.

AUGUST BROCKSCHMIDT.

Witnesses:
   T. C. BUNNELL,
   D. O. CRUMLEY.